United States Patent [19]

Crosbie et al.

[11] Patent Number: 4,519,967
[45] Date of Patent: May 28, 1985

[54] METHOD OF MAKING A SILICON METAL CONTAINING ARTICLE

[75] Inventors: Gary M. Crosbie, Dearborn; Gregory T. Bretz, Canton, both of Mich.

[73] Assignee: Ford Motor Company, Dearborn, Mich.

[21] Appl. No.: 544,942

[22] Filed: Oct. 24, 1983

[51] Int. Cl.$^3$ .......................... B28B 1/26; B28B 1/38; C04B 35/02
[52] U.S. Cl. ......................................... 264/86; 501/1; 501/97; 501/98; 501/152; 264/301
[58] Field of Search .......................... 501/97, 98, 152; 264/86

[56] References Cited

U.S. PATENT DOCUMENTS

| | | | |
|---|---|---|---|
| 3,014,835 | 12/1961 | Feigley, Jr. et al. | 264/86 X |
| 3,736,159 | 5/1973 | Gibson et al. | 264/86 X |
| 4,388,085 | 6/1983 | Sarin et al. | 501/97 X |
| 4,427,611 | 1/1984 | Oguri et al. | 264/86 |
| 4,428,895 | 1/1984 | Blasch et al. | 264/86 X |
| 4,471,060 | 9/1984 | Dickie et al. | 501/152 X |

*Primary Examiner*—Donald R. Valentine
*Attorney, Agent, or Firm*—William E. Johnson; Olin B. Johnson

[57] ABSTRACT

A method of making a silicon metal containing article is characterized in the following steps. A water vehicle first slurry is formed which contains silicon metal particles, this first slurry being substantially free of ions which would cause a flocculation of the silicon metal particles. An organic vehicle based second slurry is formed which contains a compound which has an ion which would cause flocculation of silicon metal particles contained in a water vehicle slurry. The organic vehicle of said second slurry, however, is effective to suppress formation of ions by the ion forming compound. The first and the second slurries are added to form a castable silicon metal particle containing slurry in which the compound contained in the organic vehicle can form ions when in contact with the water vehicle. The castable silicon metal particle containing slurry is introduced into a casting mold. The castable silicon metal particle containing slurry is permitted to set up in the casting mold by flocculation of the silicon metal particles by the ion of the ion forming compound. The casting mold is removed after said castable silicon metal particle containing slurry has set up, thereby to form the silicon metal containing article.

5 Claims, No Drawings

METHOD OF MAKING A SILICON METAL CONTAINING ARTICLE

TECHNICAL FIELD

This application is directed to a method of making a silicon metal containing article. The so-made article may be subsequently nitrided and sintered in order to form a dense silicon nitride article. The method taught herein is one in which a castable silicon metal particle containing slurry is cast into a casting mold. The castable silicon metal particle containing slurry is allowed to set up in the casting mold by flocculation of the silicon metal particles by the action of a flocculating ion.

BACKGROUND ART AND PRIOR ART STATEMENT

A search was conducted in the U.S. Patent and Trademark Office on the subject matter of this application. The search resulted in the citation of the following U.S. and Japanese patents: U.S. Pat. Nos. 4,043,381; 4,113,830; 4,179,301; 4,216,021; 4,264,548; 4,285,895; 4,323,323; 4,323,325; 4,332,909; 4,350,771; 4,356,136; Japanese Pat. No. 067080 of 1982; and Japanese Pat. No. 071872 of 1982.

After a very exhaustive review of the cited patents, we were of the opinion that they contained no material which was at all relevant to the subject matter which is to be disclosed and claimed in this application. Therefore, no extensive discussion will be undertaken herein with respect to the cited patents because, in effect, they are not relevant to the subject matter set forth herein.

Basically, the method disclosed in this application is one in which a silicon metal containing article can be made by a mixing of two different slurries to form a castable silicon metal particle containing slurry. The castable silicon metal particle slurry is poured into a mold and allowed to set up by a flocculation action. The mold does not have to have any portion thereof formed of a vehicle drawing medium (such as plaster of Paris) because the set-up mechanism does not require the removal of the vehicle from the castable slurry by a vehicle drawing action. Since the castable slurry sets up by flocculation, the vehicle of the castable slurry is removed by evaporative action after solidification is completed.

DISCLOSURE OF THE INVENTION

This invention is directed to a method of making a silicon metal containing article. The method is characterized in having the following steps.

A water vehicle first slurry is formed. This first slurry contains silicon metal particles. The first slurry is also substantially free of ions which would cause a flocculation of the silicon metal particles. An organic vehicle based second slurry is formed. This second slurry contains a compound which has an ion which would cause flocculation of silicon metal particles contained in a water vehicle slurry. The organic vehicle of the second slurry is selected so that it is effective to suppress formation of ions by said ion forming compound. The first and the second slurries are added to form a castable silicon metal particle containing slurry. In this castable silicon metal particle containing slurry the compound contained in the organic vehicle can form ions when in contact with the water vehicle. The ions are ones which will cause flocculation of the silicon metal particles. The castable silicon metal particle containing slurry is cast into a casting mold. The castable silicon metal particles containing slurry is permitted to set up in the casting mold by flocculation of the silicon metal particles by the ion of the compound. The casting mold is removed after the castable silicon metal particle containing slurry has set up, thereby to form the silicon metal containing article. If desired, the so-formed article may be nitrided in a nitriding operation to produce a silicon nitride article.

In accordance with more detailed aspects of a preferred embodiment of the method of the invention, the method of making a silicon metal containing article is characterized in having the following steps.

A water vehicle first slurry is formed. This first slurry contains silicon metal particles. The first slurry is also substantially free of polyvalent (a valence of 2 or more) inorganic cations and anions which would cause a flocculation of the silicon metal particles. An organic vehicle based second slurry is formed. This second slurry contains a compound which can produce a polyvalent inorganic cation or anion which would cause flocculation of silicon metal particles contained in a water vehicle slurry. The organic vehicle of the second slurry is selected so that it is effective to suppress formation of polyvalent inorganic cations and anions by the compound that forms the same. The first and the second slurries are added to form a castable silicon metal particle containing slurry. In this castable silicon metal particle containing slurry, the ion forming compound contained in the organic vehicle can form ions by dissolving into the water vehicle. The ions formed by dissolving of the ion forming compound are ones which will cause flocculation of the silicon metal particles. The castable silicon metal particle containing slurry is cast into a casting mold. The castable silicon metal particles containing slurry is permitted to set up in the casting mold by flocculation of the silicon metal particles by the ion formed by the ion forming compound. The casting mold is removed after the castable silicon metal particles containing slurry has set up, thereby to form the silicon metal containing article. If desired, the so-formed article may be nitrided in a nitriding operation and sintered to produce a silicon nitride article.

BEST MODE AND INDUSTRIAL APPLICABILITY

The novel features that are considered characteristic of the method of this invention are set forth with particularity in the appended claims. The invention itself, however, both as to its organization and its method of operation, together with additional objects and advantages thereof, will best be understood from the following description of specific examples.

The following description is what we consider to be preferred embodiments of the method of our invention. The following description also sets forth what we now contemplate to be the best mode of carrying out the method of our invention. The description is not intended to be a limitation upon the broader principles of the method of this invention; and while preferred materials are used to illustrate the method of invention in accordance with the requirements of the laws, it does not mean that other materials cannot be used to carry out our inventive method.

EXAMPLE 1

This example will describe the preparation and use of our method of making a silicon metal containing article.

A batch of about 3000 ml of a water vehicle slurry was prepared. To prepare this first slurry, the following materials were added to 1369 grams of distilled water: 23.3 grams $Fe_2O_3$, 429.0 grams $Y_2O_3$, and 6.4 grams diethylene glycol. To this first slurry was added an amount of 3120 grams of silicon metal powder. The silicon metal powder was characterized by a weight mean particle size of 4.3 μm (90% finer than 20 μm, 10% finer than 0.8 μm). The silicon metal powder contained as trace elements 0.2% Fe, 0.11% Al, and 0.01% Ca.

The water vehicle first slurry is made by the following method. The slurry is constantly tumbled on a roller bar device. After forming the distilled water with the initial ingredients set forth above, the following additions were made.

Additional silicon was added to raise the slurry specific gravity as follows. After day one, 440 grams of silicon powder was added. After eight more hours, another 440 grams of silicon powder was added. After 17 hours, 3 ml of 1N $NH_4OH$. After three more days, 150 grams of silicon metal powder was added. After seven more hours, 100 grams of silicon metal powder was added. After 16 more hours, 0.5 ml of 1N $NH_4OH$ was added, and 50 grams of silicon metal powder was added. After 24 more hours, 150 grams of silicon metal powder was added, plus 5.0 grams of diethylene glycol. After two hours, 100 grams more of silicon metal powder was added. After 48 hours, 1 ml of 1N $NH_4OH$ solution was added. A grand total of 4680 grams of silicon was added to day nine. Properties of the water vehicle first slurry on day nine were: specific gravity—1.82 $g/cm^3$ and Brookfield viscosity (50 rpm, spindle No. 2) of 320 cP.

This water vehicle first slurry is one which now contains silicon metal particles. The first slurry is substantially free of ions which would cause a flocculation of the silicon metal particles. For example, while yttrium is included in the first slurry, the yttrium is in the form of calcined yttrium oxide which does not dissolve to any significant extent in the water vehicle, whereby flocculating yttrium cations would be released. Since there is no substantial dissolving of yttrium oxide in water, then there is no substantial presence of yttrium cations to act as a flocculation agent, even though yttrium oxide is present in the water vehicle as a particle component thereof. The yttrium oxide is, of course, used as a sintering agent as is well known in the art. The $Fe_2O_3$ is used as aid in nitriding.

An organic vehicle based second slurry was prepared in the following manner. 15 grams of yttrium carbonate were dispersed in 28 grams of diethylene glycol. The yttrium carbonate is a compound which can form polyvalent cations which cause a flocculation of silicon metal particles in a water vehicle. However, when the yttrium carbonate is dispersed in the diethylene glycol, the yttrium carbonate cannot ionize and therefore does not form any yttrium cations.

In the next step of the method of our invention, 600 ml of the water vehicle first slurry was added to 22 grams of the organic vehicle second slurry and mixed, thereby to form a castable silicon metal particle containing slurry. In the castable silicon metal particle containing slurry, the yttrium carbonate compound which had been suspended in the diethylene glycol now can dissolve into the water vehicle which it contacts by the mixing operation to thereby form yttrium cations. The yttrium cations are a form of a multivalent inorganic cation which causes flocculation of silicon metal particles in a water vehicle.

It, of course, takes a period of time for the yttrium carbonate suspended in the diethylene glycol to become dissolved in the water vehicle to release the flocculating yttrium cations. During this period of time, the castable silicon metal particle containing slurry is introduced into a casting mold. The casting mold may be formed of any suitable material and does not have to have a porous vehicle drawing portion associated therewith (such as a plaster of Paris base).

The castable silicon metal particle containing slurry is permitted to set up in the wax casting mold of a shape with sections as thin as 1.3 mm and a maximum cross-section thickness 95 mm and a height of 140 mm by flocculation of the silicon metal particles by the yttrium cation. The castable silicon metal particles are introduced into the casting mold within about 10 minutes or less of the mixing of the first and second slurries.

After setting up of the castable silicon metal particle containing slurry, the casting mold is removed therefrom, thereby to form the silicon metal containing article of our invention. If the casting mold had been made of a wax material, the casting mold could be removed by immersion in a suitable solvent.

Once the article is formed, it may be nitrided in a nitriding operation and optionally sintered, as is well known in the art, to form a silicon nitride article.

EXAMPLE 2

The water vehicle first slurry described in Example 1 was used to make the article described in Example 1. The same water vehicle first slurry was then used at a later date to cast additional articles, which are the subject of this example.

The water vehicle first slurry of Example 1, six days after casting the article described in Example 1, is treated by adding to the slurry 10 ml of distilled water and 1 ml of 1N $NH_4OH$. After 24 additional hours on the rolling device, which continuously rolls a container containing the water vehicle first slurry, an addition of 20 ml of distilled water was made. Two days later, on day 18, properties of the water vehicle first slurry were reported as follows: specific gravity—1.83 $g/cm^3$ and Brookfield viscosity of 220 cP.

For use with the above described water vehicle first slurry, a new organic vehicle based second slurry was prepared by mixing the following amounts of material: 28 grams of diethylene glycol and 15 grams of yttrium carbonate. The yttrium carbonate was dispersed in the diethylene glycol.

A castable silicon metal particle containing slurry was formed by mixing 600 ml of the water vehicle first slurry with 20 grams of the organic vehicle second slurry. Within about five minutes of formation of the castable silicon metal particle containing slurry, it was cast into a suitable wax mold with thin and thick sections such as described in Example 1. The castable silicon metal particle containing slurry was allowed to set up and harden overnight and then was removed from the mold, three days after casting.

EXAMPLE 3

At the same time as the article was made in Example 2, two other smaller cone frustrums were made using the following amounts of the two slurries: 400 ml of the water vehicle first slurry and 13.3 grams of the organic vehicle second slurry.

These slurries were mixed together as described in Example 2, and two cones were cast. The large cone had a top diameter of 2.495 inches and bottom diameter of 2.881 inches with a thickness of 1.788 inches. The small cone had a top diameter of 1.538 inches, a bottom diameter of 1.125 inches, and a thickness of 0.926 inches. The silicon metal particle containing slurry was cast into each of the cone (frustrums) molds and allowed to set up and dry. Subsequently, the molds for the cones were removed therefrom. The articles had the green densities, as follows: large cone—1.47 g/cm$^3$, small cone—1.40 g/cm$^3$.

EXAMPLE 4

In this example, the same ingredients as Example 3 are utilized to prepare the first and second slurries. However, a smaller batch was prepared and a smaller proportion of silicon was added.

A batch of 500 ml of water vehicle first slurry was prepared in the following manner. The slurry was started with 219.7 grams of distilled water to which were added 73.6 grams of $Y_2O_3$, 4.0 grams of $Fe_2O_3$, and 1.1 ml of diethylene glycol. This material was all mixed together with five $Al_2O_3$ milling balls, about 0.5 inches in diameter, for a period of 2 hours. The mixing occurred on a rolling mill with the slurry confined in a suitable container. To this mixture was added the amount of 534.5 grams of silicon powder in two approximately equal increments. All of these ingredients were left to mix overnight on the rolling mill. To this mixture, the following adjustments were made. On day one, 30 ml of distilled water plus 1 ml of 1N $NH_4OH$ along with 50 grams of silicon powder were added. On day two, 100 grams of silicon powder was added together with 1 ml of diethylene glycol. On day five, 0.5 ml of 1N $NH_4OH$ was added. A total of 684.5 grams of silicon powder were added. A total of 684.5 grams of silicon powder were added. Properties of the water vehicle first slurry on day five, were as follows: specific gravity—1.81 g/cm$^3$ and Brookfield viscosity of 304 cP.

On day five, an organic vehicle based second slurry was prepared by mixing together 30 grams of diethylene glycol and 15 grams of yttrium carbonate.

At this point, three small parts were cast for experimental procedure and batch-to-batch reproducibility of green density. Small cones, having a top diameter of 1.34 inches, a bottom diameter of 1.150 inches, and a thickness of 0.50 inches, were cast in small cups using in each of the three cases 20 grams of the water vehicle first slurry and 1 gram, 1.5 grams, and 1 gram, respectively, of the organic based second slurry. The resulting green densities of the three cast articles were 1.40 g/cm$^3$, 1.39 g/cm$^3$, and 1.38 g/cm$^3$. These values show the reproducibility of green density from batch to batch.

As another experiment, two days after the above described casting, adjustments were made to the specific gravity of the water vehicle first slurry by adding 22.0 ml of distilled water thereto. On the ninth day, a turbocharger casting was made by mixing together 250 grams of the water vehicle first slurry and 8 grams of the organic vehicle second slurry. Once mixed, these slurries formed a castable silicon metal particle containing slurry which was poured into a wax mold of turbocharger shape with thin blade sections of 0.8 mm and a maximum cross-section thickness of 54 mm. Set-up time of the so-cast materials was 1 hour 15 minutes. The wax mold was removed from the article and the article was nitrided in a nitriding operation known to the skilled artisan. The final density of the nitrided article was 2.410 g/cm$^3$.

This example showed the capability of the castable slurry to fill thin sections and thick sections of the mold.

EXAMPLE 5

This example uses a large batch of material in forming the slurries involved in formation of the castable silicon metal particle containing slurry. The differences in this example from previous examples include a different batch of silicon powder and the absence of yttrium oxide in the water vehicle first slurry.

The silicon powder used in this example has a weight average particle size of 3.5 $\mu$m (90% finer than 16 $\mu$m, 10% finer than 0.8 $\mu$m), a specific surface area of 3.9 m$^2$/g, and as chemical impurities therein, 0.73% Fe, 0.14% Al, and 0.005% Ca.

A batch of approximately 3000 ml of the water vehicle first slurry was prepared in the following manner, 1282 grams of distilled water was mixed with 6.42 grams of diethylene glycol and 3120 grams of silicon powder. The entire batch was placed in a suitable container and then placed on rolls and allowed to mix for approximately 16 hours. At this point, another 779.8 grams of silicon powder were added and the solution was placed back on the rolls for one day. Again, 779.8 grams of silicon powder were added, bringing the total to about 4640 grams of silicon after two days. Properties measured on day six, were as follows: specific gravity—1.83 g/cm$^3$ and Brookfield viscosity of 132 cP. Two weeks later, an amount of 82.2 grams of distilled water was added to the solution to reduce its specific gravity from 1.87 g/cm$^3$ back to 1.83 g/cm$^3$.

On day 22, after making a batch of the organic vehicle second slurry in the following amounts: 28 grams diethylene glycol and 15 grams of yttrium carbonate, a special series of casting experiments were conducted. Three small cones similar to those described in previous examples were cast in small cups. Each sample was cast by starting out with 20 grams of the water vehicle first slurry and mixing each such sample with 0.5 grams, 0.2 grams, and 0.4 grams of the organic vehicle second slurry. The resulting green densities for the three samples were 1.43 g/cm$^3$, 1.54 g/cm$^3$, and 1.42 g/cm$^3$. A large cone (top diameter 2.650 inches, bottom diameter 2.410 inches and thickness 1.112 inches) was also cast using 200 grams of the water vehicle first slurry and 4 grams of the organic vehicle second slurry. The green density recorded for this article was 1.49 g/cm$^3$.

On this date, a turbocharger was cast in a wax mold demonstrating the flowability of the castable silicon metal particle containing slurry into thin 0.8 mm and thick 54 mm sections which were defined in the same mold without $Y_2O_3$ present in the water vehicle first slurry. The casting was made by using a mixture of 250 grams of the water vehicle first slurry and 5 grams of the organic vehicle second slurry mixed together. An article was successfully cast from this material and removed from the confining mold it had set up in.

The next part of this example shows how $Y_2O_3$ can be added long after the initial make-up of the water vehicle slurry. The sequence of additions is not significant.

On day 29, a total of 85 grams of distilled water was added to the water vehicle first slurry to adjust the specific gravity thereof back from 1.88 g/cm$^3$ to 1.83 g/cm$^3$. After thorough mixing, 500 ml of this first slurry was then taken and put into a new one gallon milling jar with six media alumina oxide balls. At this point, 70 grams of distilled water and 73.6 grams of $Y_2O_3$ previously mixed together were added to the water vehicle first slurry. After two hours, 20 additional grams of distilled water was added along with 0.1 ml of 1N $NH_4OH$. The entire slurry was then left to roll over a 24 hours period.

On day 30, a large cone was cast with 200 grams of the water vehicle first slurry mixed with 7 grams of the organic vehicle second slurry described above. The large cone had a top diameter of 2.355 inches, a bottom diameter of 2.550 inches, and a thickness of 0.919 inches. The castable silicon metal particle containing slurry set up in three hours. The resultant article had a green density of 1.42 g/cm$^3$.

On day 35, a final casting was made with these properties being recorded for the water vehicle first slurry: specific gravity—1.82 g/cm$^3$ and Brookfield viscosity of 100 cP. With 200 grams of the water vehicle first slurry and six grams of the organic vehicle second slurry, another large cone was solidified in one hour and the resultant article had a green density of 1.38 g/cm$^3$.

EXAMPLE 6

This example is designed to show a series of experiments using a water vehicle first slurry formed of the same ingredients as the previous Example 5. What is changed in this series of experiments is a composition of the organic vehicle second slurry which is used as the flocculating agent.

A water vehicle first slurry was prepared by mixing the following ingredients: 219.7 grams of distilled water, 1.1 ml of diethylene glycol, and 534.4 grams of silicon powder. This mixture was placed on rolls and mixed for a 24 hour period. At the end of the 24 hours, an addition of 133.6 grams of silicon powder was added to the solution and the solution was returned to the rolls. Three days later, an additional 133.6 grams of silicon powder was added and returned to the rolls. A total of 801.6 grams of silicon powder was added.

On day 13, 11 grams of distilled water was added to the solution to reduce the specific gravity from 1.86 g/cm$^3$. One day later, the properties were reported as: specific gravity 1.85 g/cm$^3$ and Brookfield viscosity 160 cP. A series of experiments was begun to study the set-up time of small cones by changing the composition of the organic vehicle second slurry.

The first experiment involved the following ingredients for the second slurry. The second slurry was formed by thoroughly mixing together 22 grams of distilled water and 15 grams of yttrium carbonate. Six small cones were poured, all using a silicon metal particle containing slurry formed of 20 grams of the water vehicle first slurry and the following amounts of the above described organic vehicle second slurry. The set-up time for these materials was too fast. As a result, thin sections could not be cast.

| Amount of Organic Second Slurry | Green Density |
| --- | --- |
| 1.3 grams | 1.35 g/cm$^3$ |
| 1.0 grams | 1.40 g/cm$^3$ |
| 0.5 grams | 1.45 g/cm$^3$ |
| 1.0 grams + 1.0 grams distilled water | 1.34 g/cm$^3$ |
| 1.0 grams + 2.0 grams distilled water | 1.34 g/cm$^3$ |
| 1.0 grams + 3.0 grams distilled water | 1.29 g/cm$^3$ |

The second set of experiments used the same method, but different ingredients for forming the organic vehicle second slurry. This organic vehicle second slurry was formed of 11 grams of distilled water plus 11 grams of 2-propanol plus 15 grams of yttrium carbonate.

Again, four small cones were cast using the same methods as described above, with the following results, the set-up times ranging from 15 to 20 minutes.

| Second Slurry | Green Density |
| --- | --- |
| 1.0 grams | 1.37 g/cm$^3$ |
| 1.0 grams + 1.0 grams distilled water | 1.32 g/cm$^3$ |
| 0.5 grams | 1.29 g/cm$^3$ |
| 2.0 grams | 1.43 g/cm$^3$ |

A third set of experiments was performed in the same manner as the first two sets on the 17th day. However, on the 17th day, 20 grams of distilled water was added to the water vehicle first slurry and that slurry was allowed to roll for an additional four hours. The organic vehicle second slurry used in conjunction with the first slurry was one formed from 28 grams diethylene glycol and 15 grams of yttrium carbonate.

Once again, four small cones were cast in the same way as described above, resulting in the following:

| Second Slurry | Green Density |
| --- | --- |
| 0.5 grams | 1.51 g/cm$^3$ |
| 0.5 grams | 1.46 g/cm$^3$ |
| 1.0 grams | 1.46 g/cm$^3$ |
| 0.7 grams | 1.49 g/cm$^3$ |

While particular embodiments of the invention have been illustrated and described, it will be obvious to those skilled in the art that various changes and modifications may be made without departing from the method of our invention. We intend to cover in the appended claims all such modifications and equivalents as fall within the true spirit and scope of our invention.

We claim:

1. A method of making a silicon metal containing article characterized in the following steps:

forming a water vehicle first slurry which contains silicon metal particles, said first slurry being substantially free of ions which would cause a flocculation of said silicon metal particles;

forming an organic vehicle based second slurry which contains a compound which has an ion which would cause flocculation of silicon metal particles contained in a water vehicle slurry, said organic vehicle of said second slurry being effective to suppress formation of ions by said ion forming compound;

adding said first and said second slurries to form a castable silicon metal particle containing slurry in which said compound contained in said organic vehicle can form ions when in contact with said water vehicle, which ions cause flocculation of silicon metal particles;

introducing said castable silicon metal particle containing slurry into a casting mold;

permitting said castable silicon metal particle containing slurry to set up in said casting mold by flocculation of said silicon metal particles by said ions of said compound; and removing said casting mold after said castable silicon metal particle containing slurry has set up, thereby to form the silicon metal containing article.

2. A method of making a silicon metal containing article, characterized in the following steps:

forming a water vehicle first slurry which contains silicon metal particles, said first slurry being substantially free of polyvalent inorganic cations and anions which would cause a flocculation of said silicon metal particles;

forming an organic vehicle based second slurry which contains an ion forming compound which when in contact with water forms polyvalent inorganic cation or anions which are effective to cause flocculation of silicon metal particles contained in a water vehicle slurry, said organic vehicle of said second slurry being effective to suppress formation of ions by said ion forming compound;

adding said first and said second slurries to form a castable silicon metal particle containing slurry in which said compound contained in said organic vehicle can form ions when in contact with said water vehicle, thereby to form ions which cause flocculation of silicon metal particles;

introducing said castable silicon metal particle containing slurry into a casting mold;

permitting said castable silicon metal particle containing slurry to set up in said casting mold by flocculation of said silicon metal particles by said ions of said ion forming compound; and removing said casting mold after said castable silicon metal particle containing slurry has set up, thereby to form the silicon metal containing article.

3. A method of making a silicon metal containing article characterized in the following steps:

forming a water vehicle first slurry which contains silicon metal particles, said first slurry being substantially free of polyvalent inorganic cations which would cause a flocculation of said silicon metal particles;

forming an organic vehicle based second slurry which contains a compound which can form polyvalent inorganic cations which would cause flocculation of silicon metal particles contained in a water vehicle slurry, said organic vehicle of said second slurry being effective to suppress formation of polyvalent inorganic cations by said polyvalent inorganic cation forming compound;

adding said first and said second slurries to form a castable silicon metal particle containing slurry in which said compound contained in said organic vehicle can form polyvalent inorganic cations when in contact with said water vehicle, which polyvalent inorganic cations cause flocculation of silicon metal particles;

introducing said castable silicon metal particle containing slurry into a casting mold;

permitting said castable silicon metal particle containing slurry to set up in said casting mold by flocculation of said silicon metal particles by said polyvalent inorganic cations of said compound; and removing said casting mold after said castable silicon metal particle containing slurry has set up, thereby to form the silicon metal containing article.

4. The method of claim 3, in which said polyvalent inorganic cations dissolve in said water vehicle.

5. The method of claim 4, in which said polyvalent inorganic cations are selected from the group of cations of yttrium, magnesium and aluminum.

* * * * *